(12) United States Patent
Arnott et al.

(10) Patent No.: US 6,976,187 B2
(45) Date of Patent: Dec. 13, 2005

(54) REBUILDING REDUNDANT DISK ARRAYS USING DISTRIBUTED HOT SPARE SPACE

(75) Inventors: Randy M. Arnott, Mont Vernon, NY (US); Jeffrey T. Wong, Newton, MA (US)

(73) Assignee: Broadcom Corporation, Irvine, CA (US)

( * ) Notice: Subject to any disclaimer, the term of this patent is extended or adjusted under 35 U.S.C. 154(b) by 389 days.

(21) Appl. No.: 10/035,470

(22) Filed: Nov. 8, 2001

(65) Prior Publication Data

US 2003/0088803 A1    May 8, 2003

(51) Int. Cl.⁷ .............................................. G06F 11/00
(52) U.S. Cl. ........................................ 714/5; 711/133
(58) Field of Search ............................... 714/5, 6, 7, 8, 714/41, 42, 47, 54; 711/114, 133, 134

(56) References Cited

U.S. PATENT DOCUMENTS

| | | | | |
|---|---|---|---|---|
| 5,265,098 A | * | 11/1993 | Mattson et al. ................. | 714/6 |
| 5,479,653 A | * | 12/1995 | Jones ............................. | 714/5 |
| 5,485,571 A | * | 1/1996 | Menon ........................... | 714/7 |
| 5,689,678 A | * | 11/1997 | Stallmo et al. ............. | 711/114 |
| 5,941,994 A | * | 8/1999 | DeKoning et al. ............. | 714/7 |
| 5,959,860 A | * | 9/1999 | Styczinski .................... | 700/12 |
| 6,079,029 A | | 6/2000 | Iwatani et al. ................. | 714/6 |
| 6,092,215 A | * | 7/2000 | Hodges et al. ................. | 714/6 |
| RE36,846 E | * | 8/2000 | Ng et al. ........................ | 714/6 |
| 6,154,853 A | | 11/2000 | Kedem .......................... | 714/6 |
| 6,609,213 B1 | * | 8/2003 | Nguyen et al. ................ | 714/4 |

* cited by examiner

Primary Examiner—Nadeem Iqbal
(74) Attorney, Agent, or Firm—Sterne, Kessler, Goldstein & Fox PLLC

(57) ABSTRACT

A method and system that allows the distribution of hot spare space across multiple disk drives that also store the data and redundant data in a fully active array of redundant independent disks, so that an automatic rebuilding of the array to an array of the identical level of redundancy can be achieved with fewer disk drives. The method configures the array with D disk drives of B physical blocks each. N user data and redundant data blocks are allocated to each disk drive, and F free blocks are allocated as hot spare space to each disk drive, where $N+F<=B$, and $((D-M) \times F)>=N$. Thus, rebuilding of data and redundant blocks of a failed disk drive in the free blocks of the remaining disk drives is enabled after M disk drive failures.

9 Claims, 8 Drawing Sheets

REBUILDING REDUNDANT DISK ARRAYS USING DISTRIBUTED HOT SPARE SPACE

FIELD OF THE INVENTION

This invention relates generally to the field of disk storage subsystems, and more particularly to redundant arrays of independent disks (RAID) subsystems.

BACKGROUND OF THE INVENTION

Most modem, mid-range to high-end disk storage subsystems are arranged as redundant arrays of independent disks (RAID). A number of RAID levels are known. RAID-1 includes sets of N data disks and N mirror disks for storing copies of the data disks. RAID-3 includes sets of N data disks and one parity disk. RAID-4 also includes sets of N+1 disks, however, data transfers are performed in multi-block operations. RAID-5 distributes parity data across all disk drives in each set of N+1 disk drives. At any level, it is desired to have RAID subsystems where an input/output (I/O) operation can be performed with minimal operating system intervention.

One of the most important aspects of any RAID subsystem is its ability to withstand a disk drive failure. To implement this feature, the disk drives used by the RAID subsystem must have some amount of data duplicated. This data is the "redundant" data, and RAID levels 1, 10, 5 and 50 are some of the more popular RAID levels because of the redundancy provided. With redundant data, any one of the disk drives in the RAID array can fail, while still ensuring complete data integrity. When a disk drive does fail, the RAID subsystem takes the redundant data, and uses it to reconstruct all of the data originally stored onto the array. While the RAID subsystem is doing this failure recovery, the RAID array is operating in a "degraded" state. For most RAID levels, a second disk drive failure could result in some data loss for the user.

However, when a RAID subsystem is operating in a degraded state, the risk of losing data is much greater. Therefore, RAID subsystems attempt to minimize the time that the array operates in the degraded state. When a new disk drive is added to an array, the RAID subsystem regenerates redundant data in a process known as "rebuilding the array." The rebuild process can take several hours to complete. If user intervention is required to start the rebuild process, rebuilding may not complete until several days have passed. Having a RAID array in the degraded state for several days puts the integrity of the data at great risk.

To work around the problem of requiring user intervention, most RAID subsystems implement use what are called "hot spare" disk drives. With hot spares disk drives, an extra disk drive is set aside in "stand-by mode" to allow the rebuild process to start the instant a disk drive failure is detected.

However, a hot spare is an attached disk drive that does not get used except in the event of a disk drive failure. This is a waste of a disk drive that could otherwise be used to increase performance while the array is not operating in the degraded state.

Another way to allow the immediate start of a rebuild operation is to change the RAID level of the array to one that has less redundancy, and, therefore uses fewer disk drives. While this is useful, it will also leave the array in a state that has less redundancy than the user originally wanted after the rebuild completes, see for example, U.S. Pat. No. 5,479,653 issued to Jones on Dec. 26, 1995 "Disk array apparatus and method which supports compound raid configurations and spareless hot sparing."

Therefore, there is a need for a RAID subsystem that can rebuild the array to an equivalent level of redundancy without requiring a spare standby disk drive. In addition it is desire that the subsystem can tolerate multiple failures.

SUMMARY OF THE INVENTION

Then present invention enables an immediate restart of rebuilding a RAID subsystem after a disk drive failure without requiring a dedicated standby spare disk drive. When an array is used with this invention, the array is an array of partitions of each disk drive, rather than the whole disk drive. This leaves extra hot spare space on each disk drive to allow a new array to be built, with fewer disk drives, but the same redundancy level of the array that had a disk drive failure.

There are two advantages to having the hot spare space distributed over all disk drives. First, the dedicated standby disk that would otherwise have been idle during user I/O is now an active part of the array, causing the array to perform faster because it has more disk drives. Second, the standby disk drive that would have been idle during user I/O cannot fail undetected because, with the invention, all disk drives are in constant use, and not standing by idle.

More particularly, a method and system allows the distribution of hot spare space across multiple disk drives that also store the data and redundant data in a fully active array of redundant independent disks, so that an automatic rebuilding of the array to an array of the identical level of redundancy can be achieved with fewer disk drives.

The method configures the array with D disk drives of B physical blocks each. N user data and redundant data blocks are allocated to each disk drive, and F free blocks are allocated as hot spare space to each disk drive, where $N+F<=B$, and $((D-M) \times F)>=N$. Thus, rebuilding of data and redundant blocks of a failed disk drive in the free blocks of the remaining disk drives is enabled after M disk drive failures. As an advantage, the method and system according to the invention can correctly handle single failures, multiple sequential failures, and multiple concurrent failures.

DETAILED DESCRIPTION OF THE PREFERRED EMBODIMENTS

Configuring and Allocating a Redundant Array of Independent Disks

Figure 1:
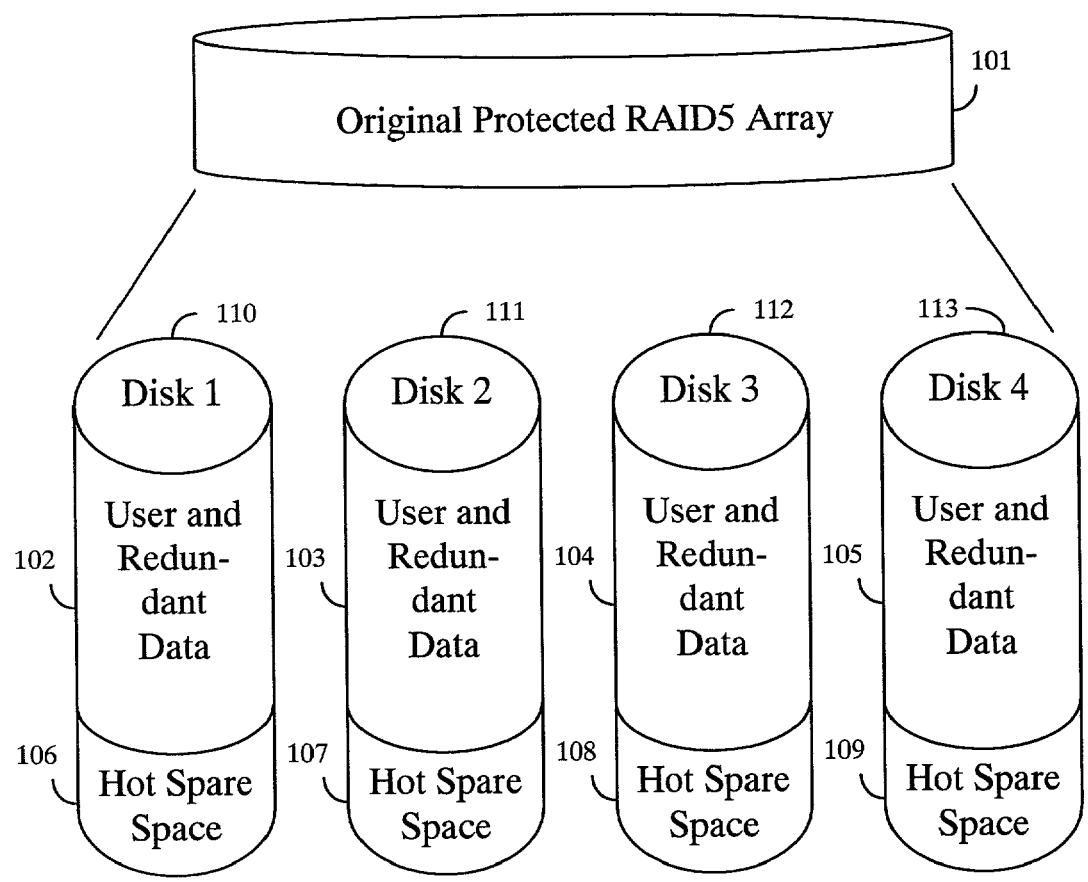
FIG. 1 is a block diagram of a RAID5 array with blocks allocated and configured according to the invention.

FIG. 1 shows an example RAID5 array 101 using four disk drives 110–113 with partitions configured and allocated according to the invention. The array 101 is configured by allocating user and redundant data partitions 102–105 and hot spare space partitions 106–109 distributed over all four disk drives in active use. The hot spare space partitions are used in the event of a disk failure.

Figure 2:
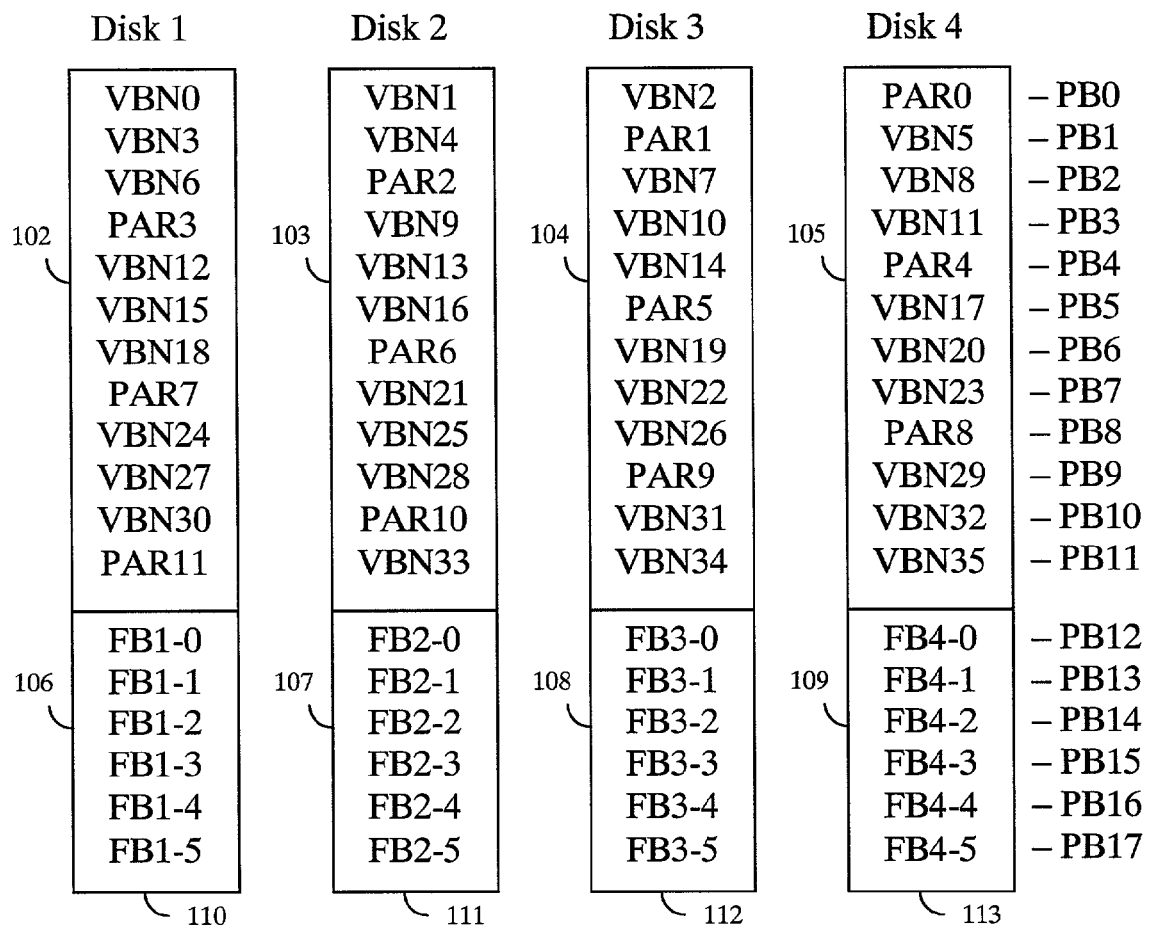
FIG. 2 is a block diagram of the data partitions of the disk drives in FIG. 1 according to the invention.

FIG. 2 shows block level details of the allocations of various partitions 102–109 of the disk drives 110–113. Each disk drive has, for example, eighteen physical blocks that are labeled on the right as PB0–PB17. The RAID5 array, presents the data to the user by mapping blocks accessed by the user to the physical blocks on the disk drive. Those blocks are known as virtual blocks, each having a virtual block number labeled VBN0–VBN35 for an array of thirty-six virtual blocks.

The RAID5 array also generates and maintains redundant data in the form of distributed parity blocks for the set of virtual blocks that contain user data at the same physical address as each of the other disk drives. For other RAID sets, the redundant data could be duplicated data, or data created with operations other than an XOR operation. The RAID5 parity data is labeled as PAR0–PAR11 in the array 101.

In addition to the virtual and parity blocks, there are also free blocks, which are labeled FBn-0 through FBn-5. In the example shown, the free blocks are the last six physical blocks of each disk drive. Note, the total number of free blocks distributed across one fewer than the total number of four disk drives (3×6), is equal to or greater than the number of data and parity blocks on a single disk drive of the array. In other words, if one disk drive fail completely, then the virtual and parity blocks of the failed disk drive can be rebuilt, in a redundant manner, in the free blocks of the remaining disk drives. Note, with this configuration and allocation, the system has full use of all four disk drives, and can process disk access request faster than in the case where one disk drive sits aside idle as a "hot" spare disk drive as in the prior art.

There, according to the invention, the configuration and allocation of the blocks on the disk drives of the array 101 is subject to the following constraints.

Number of disk drives D.
Number of physical blocks on each disk drive B.
Total number of physical blocks D×B.
Number of virtual and parity blocks on each disk drive N.
Number of free blocks used for hot spare space on each disk drive F, where $N+F<=B$, and $((D-1)\times F)>=N$.

It should be understood that the invention can also be used with other like mappings of physical, virtual, parity, and free blocks that obey the above constraints, and that in practical applications each disk drive has tens of thousands of blocks.

Rebuilding the Array after Failure

Figure 3:
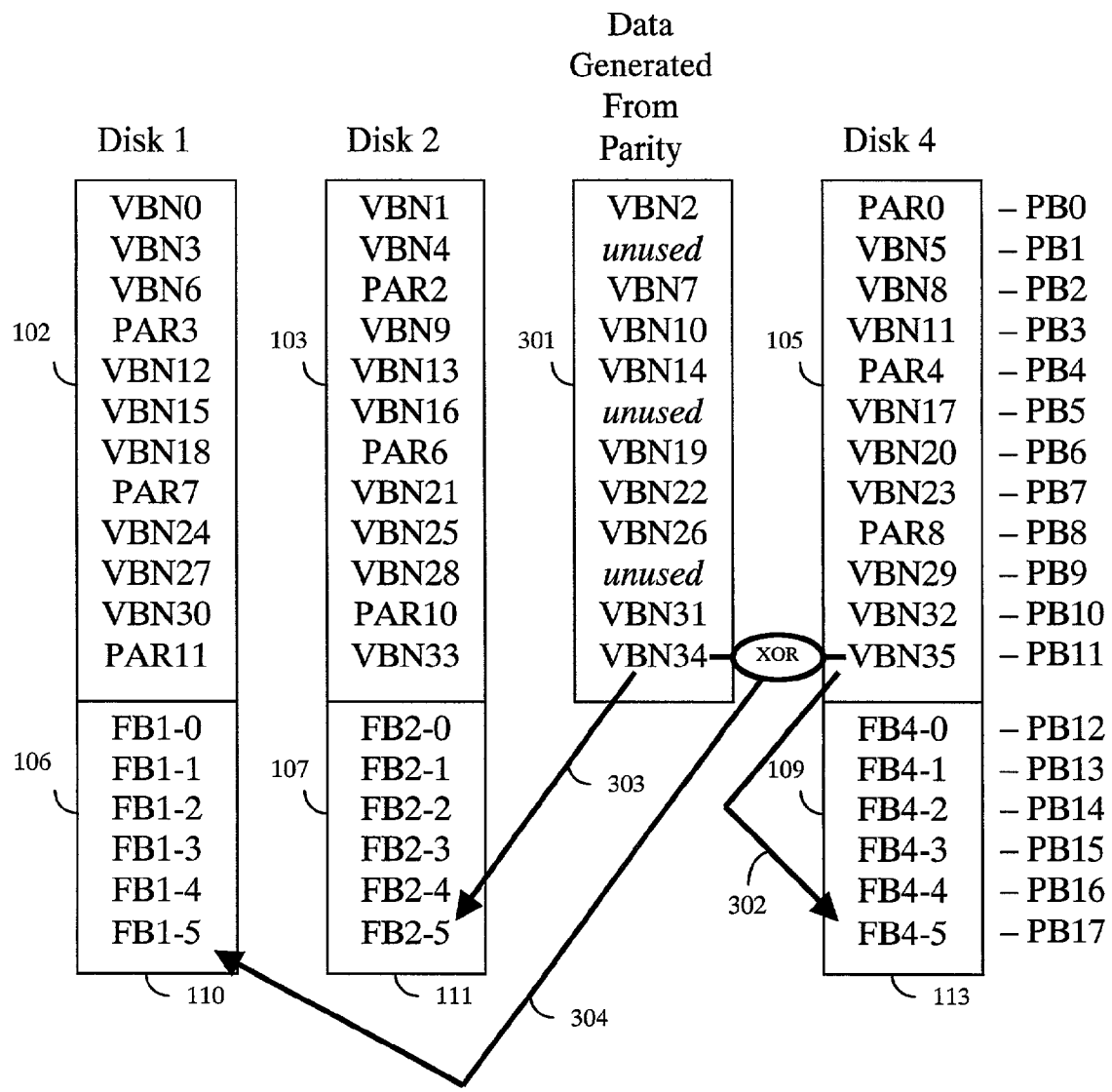
FIG. 3 is a block diagram of the data available and reproduced after a disk failure during a first step of an on-line rebuilding process according to the invention.

FIG. 3 shows the data in the array after Disk 3 104 has failed. The array is now operating in a degraded state, with no redundant data to protect the user from another disk drive failure. After the failure is detected, a process begins to rebuild a new RAID5 array on the remaining disk drives has redundant data. As a feature of the present invention, unlike the prior art, the rebuilt can begin immediately while the array remains accessible for user operation.

In FIG. 3, the data 102-103-105 on the remaining disk drives 110-111-113 is shown, along with data 301 to be rebuilt from the virtual and parity blocks of the remaining data. Data 301 represents the data that was stored on the failed disk drive.

After a disk drive failure, the rebuild process begins as shown in FIG. 3, by moving the last virtual block VBN35, to the block of free space on the last physical block on the last disk drive 113 labeled FB4-5. The arrow 302 shows this movement of data. Next, the second to last virtual block VBN34 is moved into the last physical block on the second to last functioning disk drive 111 shown as block FB2-5. The arrow 303 shows this movement of data. After that, the parity data, i.e., redundant data is generated from blocks VBN34 and VBN35 using an exclusive OR (XOR) operation. The parity data is stored on the first disk 110 in the block labeled FB1-5. The arrow 304 shows this data generation and movement.

Figure 4:
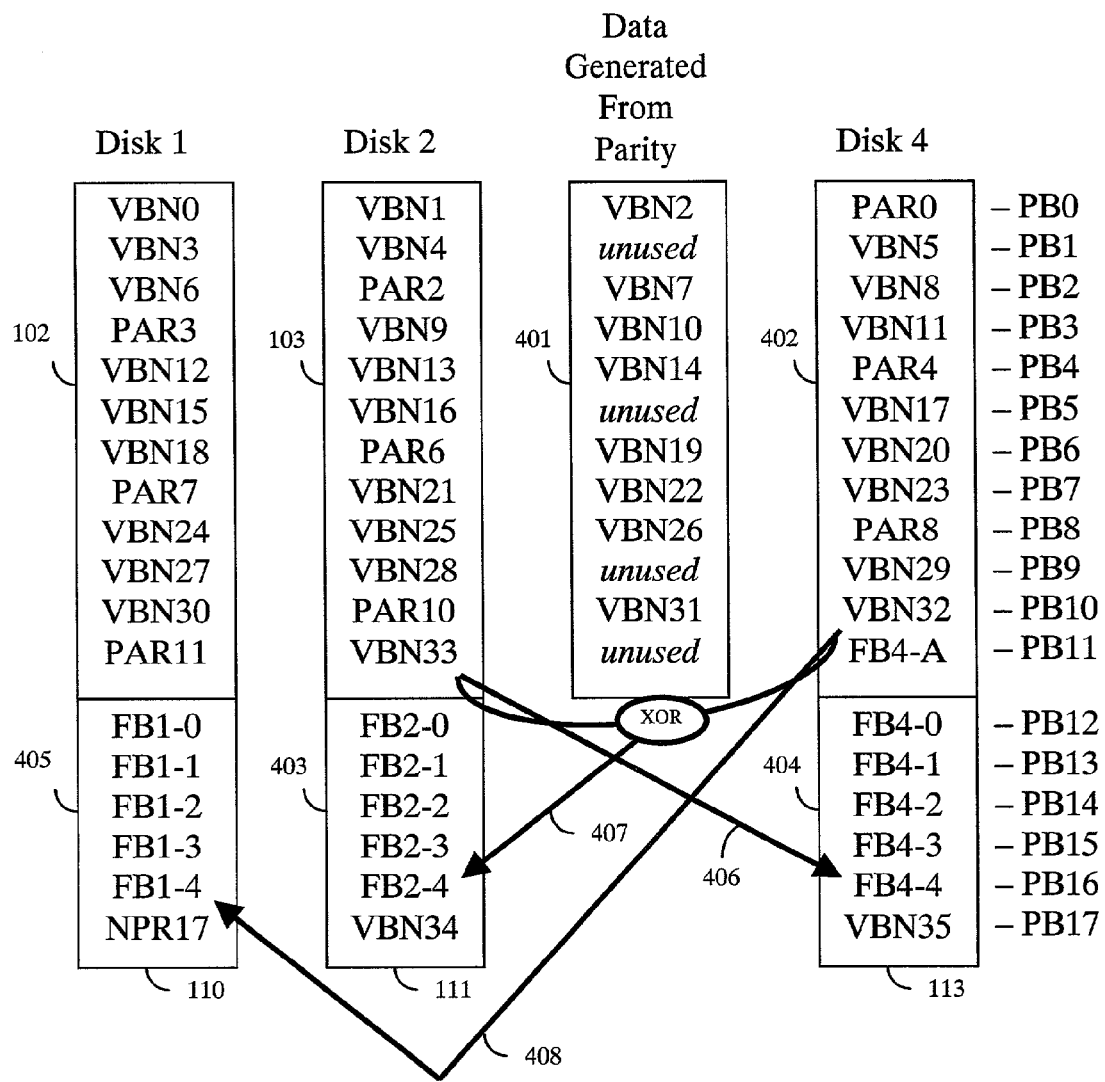
FIG. 4 is a block diagram of the data available and reproduced after the first step of the on-line rebuild process with a second step of the on-line rebuild process according to the invention.

FIG. 4 shows the data stored on the disk drives 110-111-113. Specifically data shown on these disk drives is shown in the new partitions 102-103-402 and in the new free space areas 403-404-405. Specifically, Disk 4 113, data partition 402, now has a new free block FB4-A where VBN35 used to be, and block VBN35 is now on the old free space 404 of that disk. The new generated data 401, no longer generates the data for block VBN34 and that block is unused because block VBN34 is now stored on the free space 403 of Disk 2 111. The new parity data block NPR17 generated from block VBN34 and block VBN35 is stored in the partition 405 that used to have only free space.

FIG. 4 also illustrates the next movement of data in the process. Block VBN33 is moved into block FB4-4 as shown by arrow 406. Block VBN32 is then moved into block FB1-4 as shown by arrow 408. A new parity block is generated from blocks VBN33 and VBN32 and stored in block FB2-4.

Figure 5:
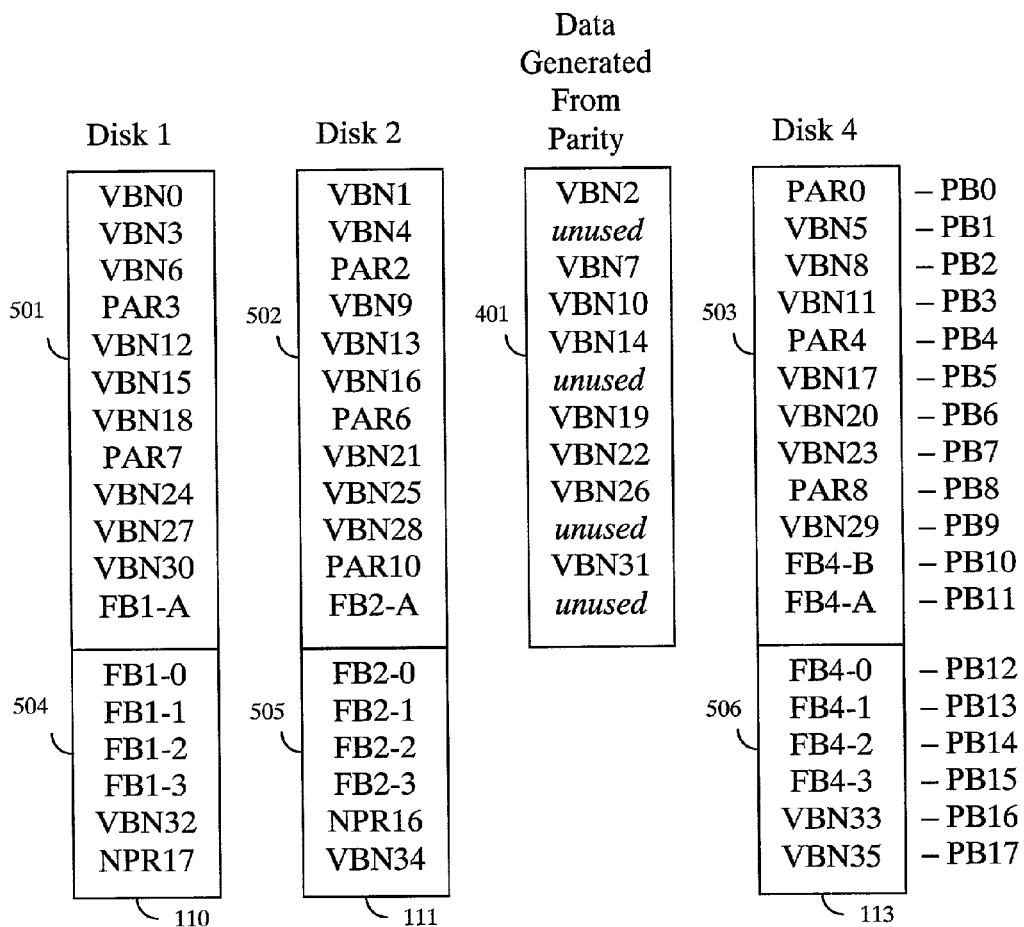
FIG. 5 is a block diagram of the data available and reproduced after the second step of the on-line rebuild process according to the invention.

FIG. 5 shows the result after the movements described in the above paragraph. The disk drives that are still functioning 110-111-113, now store a new set of data 501–506 as a result of those movements. Specifically, the resulting partitions in the old array 501-502-503 now have new free blocks FB2-A, FB1-A and FB4-B, and the resulting free space areas 504-505-506, which are now partitions used in the new RAID5 array, have blocks VBN33, NPR16, and VBN32.

The process of moving the data continues for each of the remaining blocks in the same manner until all of the data has been built and moved to different physical blocks, on the remaining three functioning disk drives.

Figure 6:
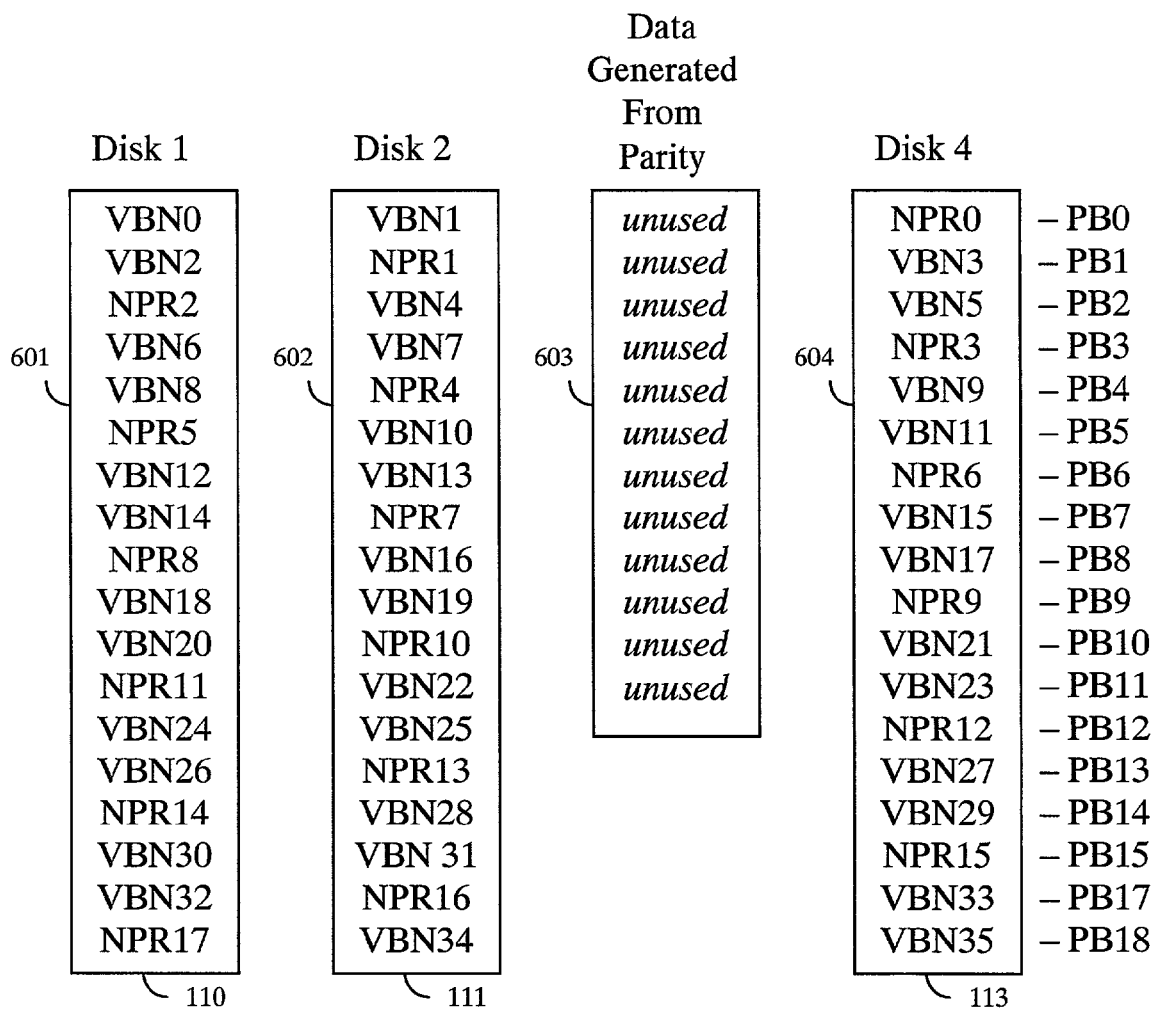
FIG. 6 is a block diagram of a final data array after the on-line rebuild process has completed according to the invention.

FIG. 6 illustrates the final arrangement of data. The functioning disk drives 110-111-113 now have all of the data and parity 601-602-604 required for a level RAID-5 array which still can withstand another single disk drive failure. The resulting RAID5 array is at the same RAID level as the original array. There is no longer a need for any generated data 603 to be presented to the user.

Figure 7:
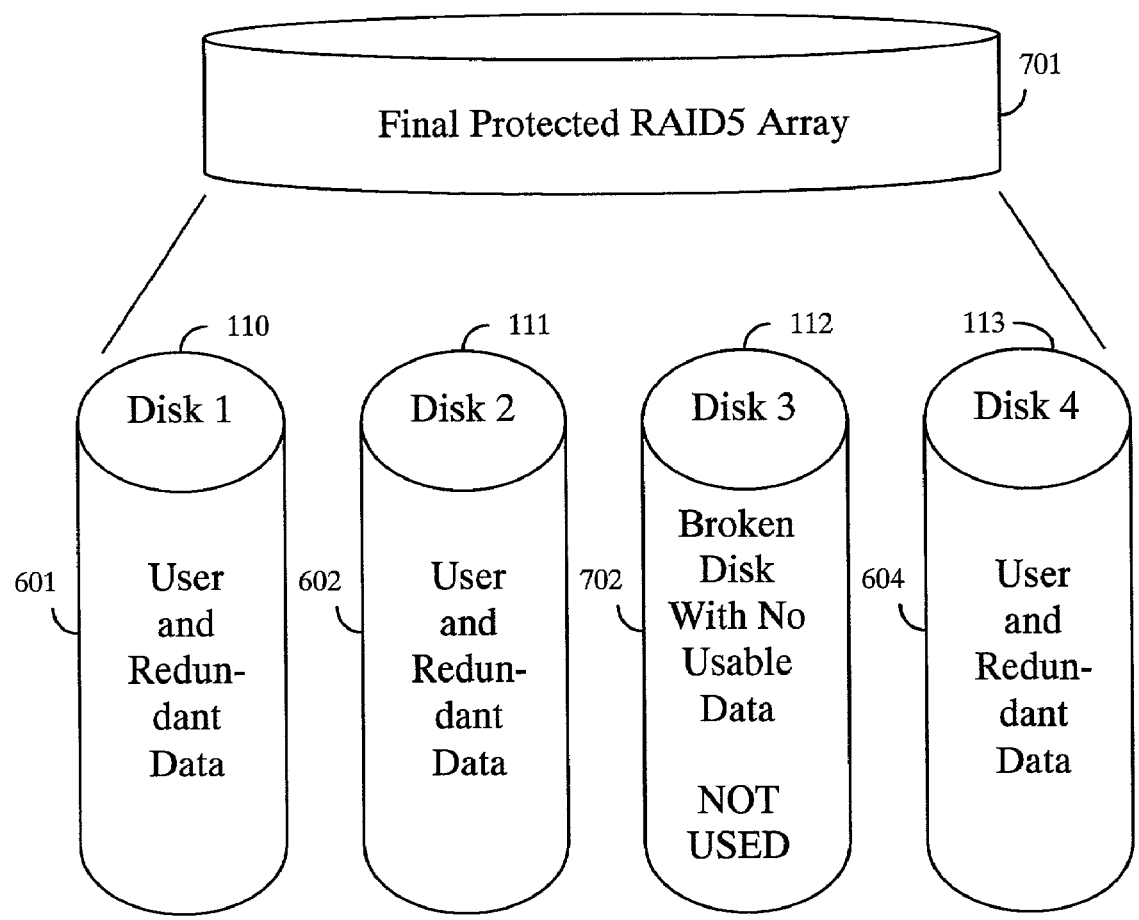
FIG. 7 is a block diagram of the RAID5 array that exists after the on-line rebuild operation is completed according to the invention.

FIG. 7 shows the final protected RAID5 array 701 at the topmost level. The user and parity data 601-602-604 are only stored on the functioning disk drives 110-111-113, while disk 3 112 remains broken. Disk 3 only presents bad blocks 702 to the RAID subsystem, and those blocks 702 are no longer used in any array.

Protecting Against Multiple Sequential Disk Drive Failures

The description details the step by step process of rebuilding a RAID5 set using distributed hot spare space when a single disk drive fails. If, after the rebuild operation, it is desired to have enough hot spare space for another rebuild, then the free space shown in FIG. 1 is large enough to accommodate the necessary additional free space.

More specifically, this enables data recovery in the case where a disk drive fails, a rebuild finishes, and then another disk drive fails subsequently. By implementing this additional free space, a subsequent failure can still automatically begin the rebuild operation. Thus, an array configured according to the invention can tolerate multiple sequential disk drive failures.

Sequential disk drive failures is defined as failures which occur after a rebuild completes so that the array is no longer operating in a degraded state at the time of failure.

To accommodate the additional hot spare space after a rebuild, the configuration and allocation of the blocks on the disk drives of the array 101 is now subject to the following constraints:

Number of disk drives D.
Number of physical blocks on each disk drive B.
Total number of physical blocks D×B.
Number of virtual and parity blocks on each disk drive N.
Number of disk drives that can fail in sequence M.
Number of free blocks used for hot spare space on each disk drive F, where $$N+F<=B, \text{ and } ((D-M)\times F)>=N.$$

All of the steps described above are performed for each sequential failure, still leaving a rebuild array with level RAID5 redundancy. The blocks are now allocated with the following constraints:

$$N+F<=B, \text{ and } ((D-(M-1))\times F)>=N,$$

where D is now the total number of disk drives used by the new array. The resulting array can go through the rebuild procedure (M-1) more times.

Protecting Against Multiple Concurrent Disk Drive Failures

While the procedures above describe the invention in the context of a RAID5 set, other RAID sets, which allow for more than one disk drive failure, can also be used. Some RAID levels that can withstand more than one concurrent disk drive failure are RAID10, RAID6, and RAID1 with more than two duplicated disk drives. Concurrent disk drive failures are defined as disk drive failures that occur before a rebuild completes.

For any of these cases, the step by step process for rebuilding the array to a repaired state at the identical RAID redundancy level, consists of moving data and generating new multiply redundant data into the free space areas similar to the steps described for RAID5. Instead of just one parity block, multiple blocks of redundant information are created.

The most important difference is the amount of free space needed to enable for multiple disk drives failing concurrently. To accommodate a rebuild with multiple disk drives failing concurrently, the configuration and allocation of the blocks on the disk drives of array 101 is subject to the following constraints:

Number of disk drives D.
Number of physical blocks on each disk drive B.
Total number of physical blocks D×B.
Number of virtual and parity blocks on each disk drive N.
Number of drives that can fail concurrently M.
Number of free blocks used for hot spare space on each disk drive F, where $$N+F<=B, \text{ and } ((D-M)-F)>=N.$$

By adding additional free space, the array configured according to the invention can tolerate multiple disk drive concurrent failures, for example, another failure before the rebuild can commence, or a failure during rebuild.

Method Overview

Figure 8:
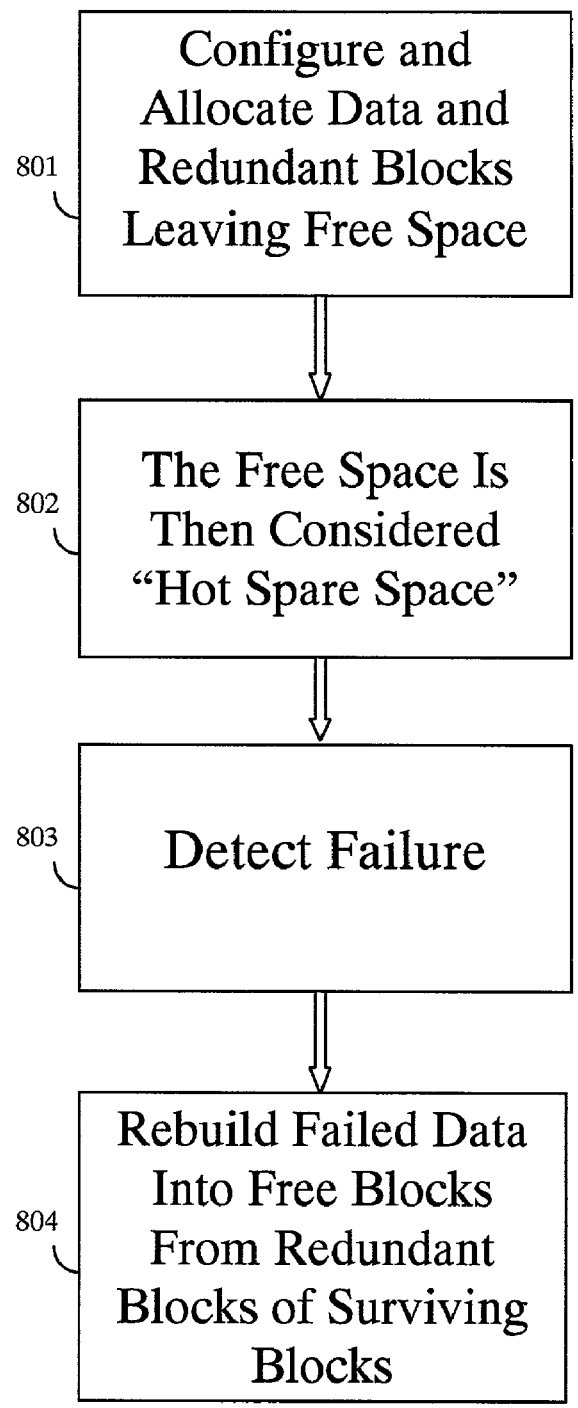
FIG. 8 is a flow diagram of a method for rebuilding the array of FIG. 1 using distributed hot spare space according to the invention.

FIG. 8 shows the steps used by the method for configuring, allocating, and rebuilding a RAID subsystem according to the invention.

First, the RAID array is configured and allocated to hold user data, and redundant blocks are generated from the user data in step 801. When this configuration takes place, free space is allocated to be used as distributed hot spare space in step 802.

The RAID subsystem then detects a failure in step 803, and a rebuild operation begins in step 804. The rebuild operation uses the surviving user blocks, and the redundant data to recreate the user blocks of the failed disk drive. The newly generated user data and redundant data are moved into the previously allocated free blocks to result an array at the identical RAID level as before the failure that still has full redundancy.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

We claim:

1. A method for configuring and rebuilding a redundant array of independent disks, comprising:
    configuring the array with D disk drives of B physical blocks each;
    allocating N user data and redundant data blocks to each disk drive; and
    allocating F free blocks as hot spare space to each disk drive, where N+F <=B, and ((D-M)×F)>=N to enable rebuilding of data and redundant blocks of a failed disk drive in the free blocks of the remaining disk drives after M disk drive failures.

2. The method of claim 1 further comprising:
    detecting M disk drive failures;
    generating new user data and redundant data to recover from the M disk failures;
    moving the new data and redundant data into the hot spare space; and
    rearranging all of the data and redundant blocks of the D-M disk drives to rebuild the array with fewer disks and an identical level of redundancy.

3. A method of claim 1 further comprising:
    generating new user data and redundant to recover from a single failed disk drive;
    moving the new data and redundant data into a part of the hot spare space; and
    rearranging all of the data and redundant blocks of the remaining disk drives to rebuild the array with fewer disks and an identical level of redundancy so that remaining hot spare space which can accommodate M-1 additional disk drive failures.

4. A method of claim 1 further comprising:
generating new data and redundant data for concurrent disk drive failures of more than one disk drive;
moving the new data and redundant data into a part of the hot spare space; and
rearranging all of the data and redundant blocks of the remaining disk drives to rebuild the array with fewer disks and an identical level of redundancy.

5. The method of claim 1 wherein the redundant data are mirror blocks.

6. The method of claim 1 wherein the redundant data are parity blocks.

7. The method of claim 1 wherein all disk drives except failed disk drives are actively used while recovering from the M disk drive failures.

8. The method of claim 2 wherein the generating uses an exclusive OR operation.

9. A redundant array of independent disks with hot spare space, comprising:
D disk drives of B physical blocks each;
N user data and redundant data blocks allocated to each of the D disk drives;
F free blocks allocated as hot spare space to each of the D disk drive, where N+F<=B, and ((D−M)×F)>=N; and
means for rebuilding the data and redundant blocks of a failed disk drive in the free blocks of the remaining disk drives after M disk drive failures.

* * * * *